Jan. 31, 1939.  J. W. LEIGHTON  2,145,360
WHEEL SUSPENSION
Filed Jan. 20, 1936
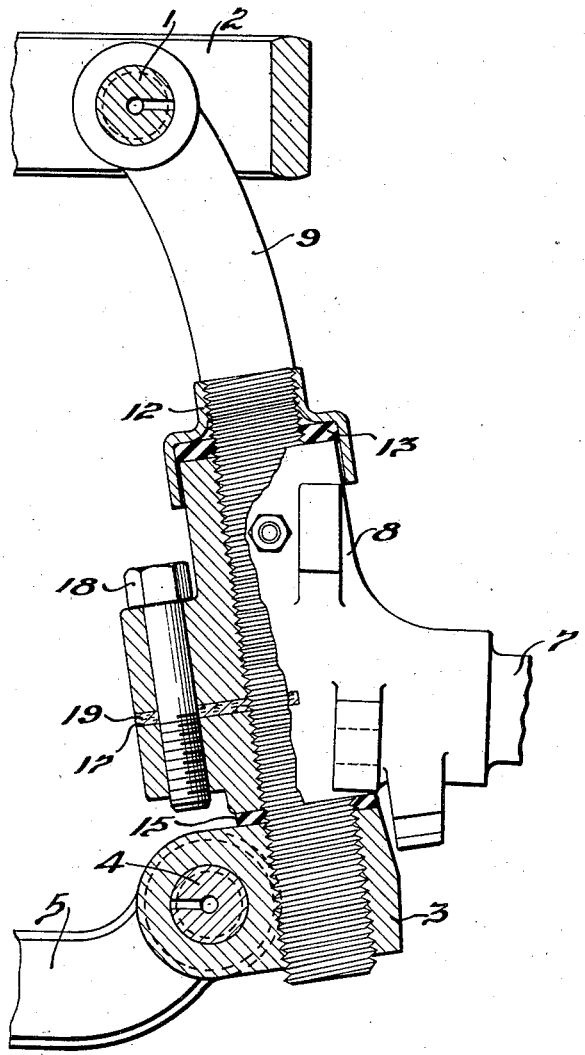
INVENTOR.
John W. Leighton.
BY
Harness, Dickey, Pierce & Hann.
ATTORNEYS.

Patented Jan. 31, 1939

2,145,360

UNITED STATES PATENT OFFICE 2,145,360

WHEEL SUSPENSION

John W. Leighton, Port Huron, Mich.

Application January 20, 1936, Serial No. 59,808

2 Claims. (Cl. 287—92)

The present invention relates to threaded bearings and to the use of such bearings in independent wheel suspensions for the front wheels of automotive vehicles. This invention is an improvement over the invention set forth in applicant's prior Patent No. 2,082,250, issued June 1, 1937.

A general object of the present invention resides in the provision of an improved independent wheel suspension construction in which threaded bearings are utilized for providing the pivotal connections between the wishbones which interconnect the frame of the vehicle and the kingpin or another member on which the wheel is mounted.

Another object of the invention is to provide a threaded bearing having an improved means for taking up free play or looseness.

Many other and further objects and advantages of the present invention will become apparent from the following specification when considered in connection with the accompanying drawing forming a part thereof.

In the drawing is shown a vertical transverse sectional view with portions broken away through the kingpin assembly at the front end of the automobile chassis, showing in detail the construction and arrangement of the improved threaded bearing and its use in an independent wheel suspension.

In the drawing is shown a threaded kingpin 9 of the type disclosed in applicant's aforementioned Patent No. 2,082,250. This kingpin is secured at its ends to a pair of levers or wishbones forming the supporting arms of an independent front wheel suspension for an automotive vehicle. The upper end of the kingpin 9 is pivotally secured in any suitable manner as by a threaded pin 1 to the outer extremity of the upper arm 2; while the lower threaded end of the kingpin 9 is threaded into a bracket 3 which is pivotally secured by means of a threaded pin 4 to the outer end of the lower arm or wishbone 5. The upper arm or lever 2 and its pivotal connection with the upper end of the kingpin 9 may be of any desired design and construction, one suitable form being disclosed in applicant's copending application Serial No. 68,595, filed March 13, 1936. Likewise the design and construction of the lower arm and its connection with the lower end of the kingpin 9 may be of any desired form, one suitable form being shown in applicant's divisional application Serial No. 96,422, filed August 17, 1936.

The front wheel of the vehicle is adapted to be journalled for rotation upon a stub axle shown fragmentarily at 7 which is formed integrally with a generally cylindrical housing 8 which surrounds the threaded portion of the kingpin 9 and is internally threaded to cooperate with the external threads upon the kingpin. The interengaging internal and external threads upon the housing 8 and kingpin 9 provide a threaded bearing by means of which the stub axle 7 may rotate with respect to the kingpin 9 during steering movements of the front wheel. A suitable steering arm (not shown) may also be suitably connected to the housing 8 to provide means for regulating the angular position of the stub axle in order to steer the vehicle.

While any suitable means may be provided for preventing access of dirt and foreign matter to the threaded bearing between the kingpin and the housing 8, it is preferred to utilize an inverted cup-shaped member 12 which is threaded onto the kingpin and serves to house a resilient annulus 13 which effectively seals the upper end of this threaded bearing. The lower end of the kingpin 9 extends through the housing 8 and has threaded thereon the fitting 3 which serves to provide means for mounting the improved lower wishbone construction hereinafter described in detail. A suitable resilient annulus or washer 15 preferably surrounds the kingpin between the fitting 3 and the lower end of the housing 8 in order, effectively, to seal the threaded bearing between these members at this point.

It has been found that threaded bearings of this general type, after they have been subjected to considerable wear, tend to become loose and consequently it is preferable that suitable means be provided for adjusting the threaded engagement between the kingpin 9 and housing 8 in order to take up wear from time to time as may be necessary. In order to accomplish this end, the housing 8 is, therefore, provided with a transverse slot 17 and an adjusting bolt 18 extends substantially parallel to the axis of rotation of the housing and serves to provide means for gradually closing the slot in order to effect a proper adjustment of the threaded engagement between the housing and the kingpin. In order to prevent the access of foreign material to the threaded bearing at this point, the slot 17 may be filled with suitable resilient packing material 19, as may be desired.

While only one form of the invention is shown and described herein, others are available within the spirit of the invention and within the scope of the appended claims.

I claim as my invention:

1. In a wheel suspension construction, a wheel supporting stub axle member having an internally threaded opening extending substantially at right angles to the stub axle, an externally threaded supporting spindle threaded into said opening and adapted to provide a threaded journal for said member, and means for substantially eliminating free play between the relatively rotatable axle member and spindle including an open slot in the axle member extending transversely to the axis of the threaded opening therein and intersecting said opening, and means for drawing the portions of said member on opposite sides of said slot together to distort said member and thereby tighten said threaded bearing surfaces upon each other.

2. A threaded bearing assembly comprising an externally threaded journal, an internally threaded outer bearing member threaded upon said journal for oscillating movement with respect thereto, and means for substantially eliminating free play between the relatively rotatable threaded bearing member and journal including an open slot in the outer bearing member extending transversely to the axis of the threaded opening therein and intersecting said opening, and means for drawing the portions of said member on opposite sides of said slot together to distort said member and thereby tighten said threaded bearing surfaces upon each other.

JOHN W. LEIGHTON